(12) United States Patent
Kortüm et al.

(10) Patent No.: US 6,254,179 B1
(45) Date of Patent: Jul. 3, 2001

(54) AIR CONDITIONABLE VEHICLE SEAT

(75) Inventors: Franz-Josef Kortüm, Pfaffenhofen; Michael Kempter, München; Günther Hammerschmid, Buchenhain, all of (DE)

(73) Assignee: Webasto Thermosysteme GmbH, Stockdorf (DE)

( * ) Notice: Subject to any disclaimer, the term of this patent is extended or adjusted under 35 U.S.C. 154(b) by 0 days.

(21) Appl. No.: 09/284,968

(22) PCT Filed: Nov. 6, 1997

(86) PCT No.: PCT/EP97/06178

§ 371 Date: Apr. 12, 2000

§ 102(e) Date: Apr. 12, 2000

(87) PCT Pub. No.: WO99/24275

PCT Pub. Date: May 20, 1999

(51) Int. Cl.[7] .................................................. A47C 7/74
(52) U.S. Cl. ................................ 297/180.12; 297/180.1; 297/180.15
(58) Field of Search ..................... 297/180.12, 180.1, 297/180.13, 180.15

(56) References Cited

U.S. PATENT DOCUMENTS

| | | | |
|---|---|---|---|
| 1,775,607 | * 9/1930 | Tranchell | 297/180.1 X |
| 2,684,672 | * 7/1954 | Summerville | 297/180.1 X |
| 2,912,832 | * 11/1959 | Clark | 297/180.13 X |
| 3,137,523 | * 6/1964 | Karner | 297/180.13 |
| 3,486,177 | * 12/1969 | Marshack | 297/180.13 X |
| 3,738,702 | * 6/1973 | Jacobs | 297/180.15 |
| 4,175,297 | * 11/1979 | Robbins et al. | 297/180.13 X |
| 4,561,441 | * 12/1985 | Kolodziej | 297/180.15 X |
| 4,923,248 | * 5/1990 | Feher | 297/180.13 X |
| 4,964,674 | * 10/1990 | Altmann et al. | 297/180.12 |
| 5,002,336 | * 3/1991 | Feher | 297/180.13 |
| 5,016,302 | * 5/1991 | Yu | 297/180.14 X |
| 5,117,638 | 6/1992 | Feher . | |
| 5,138,851 | 8/1992 | Mardikian . | |
| 5,354,117 | * 10/1994 | Danielson et al. | 297/180.15 |
| 5,370,439 | * 12/1994 | Lowe et al. | 297/180.13 X |
| 5,385,382 | * 1/1995 | Single, II et al. | 297/180.13 |
| 5,613,729 | * 3/1997 | Summer, Jr. | 297/180.14 X |
| 5,613,730 | * 3/1997 | Buie et al. | 297/180.15 X |
| 5,617,811 | * 4/1997 | Johnson | 297/180.15 X |
| 5,715,695 | * 2/1998 | Lord | 297/180.1 X |
| 5,918,930 | * 7/1999 | Kawai et al. | 297/180.13 |
| 5,924,767 | * 7/1999 | Pietryga | 297/180.13 |
| 6,059,018 | * 5/2000 | Yoshinori et al. | 297/180.13 X |
| 6,079,781 | * 6/2000 | Tilley | 297/180.13 X |

FOREIGN PATENT DOCUMENTS

| | | |
|---|---|---|
| 1 962 665 | 7/1971 | (DE) . |
| 25 24 943 | 12/1976 | (DE) . |
| 12 059 | 5/1995 | (DE) . |
| 2 278 432 | 11/1994 | (GB) . |

* cited by examiner

Primary Examiner—Peter M. Cuomo
Assistant Examiner—Rodney B. White
(74) Attorney, Agent, or Firm—Nixon Peabody LLP; David S. Safran

(57) ABSTRACT

A climate controlled vehicle seat for interior climate comfort in motor vehicles, more specifically, the ease of climate control via a motor vehicle seat, is increased based upon a fluid for transport of heat or cool to a corresponding heating or cooling element, or a combined heating/cooling element which is installed in the motor vehicle seat and which is connected to a heat or cold source which is present in the vehicle for other heating or cooling purposes. This heating or cooling of the motor vehicle seat is favorable in terms of energy and is also, with respect to health, safe to use. The corresponding heating and cooling fluid is taken from the secondary circuit of a heat exchanger which is preferably filled with pure water, i.e. with water which does not contain any harmful additives.

22 Claims, 2 Drawing Sheets

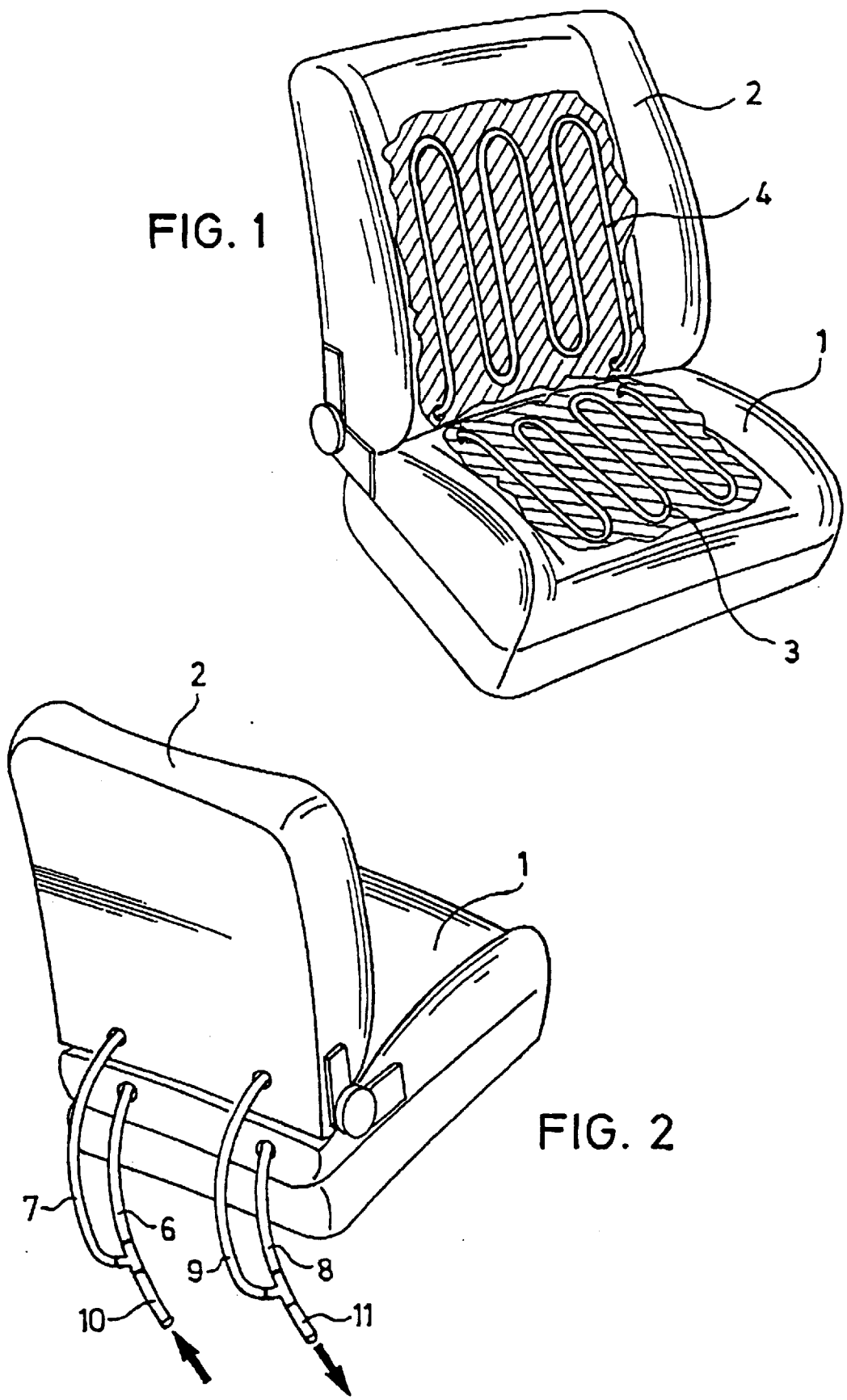

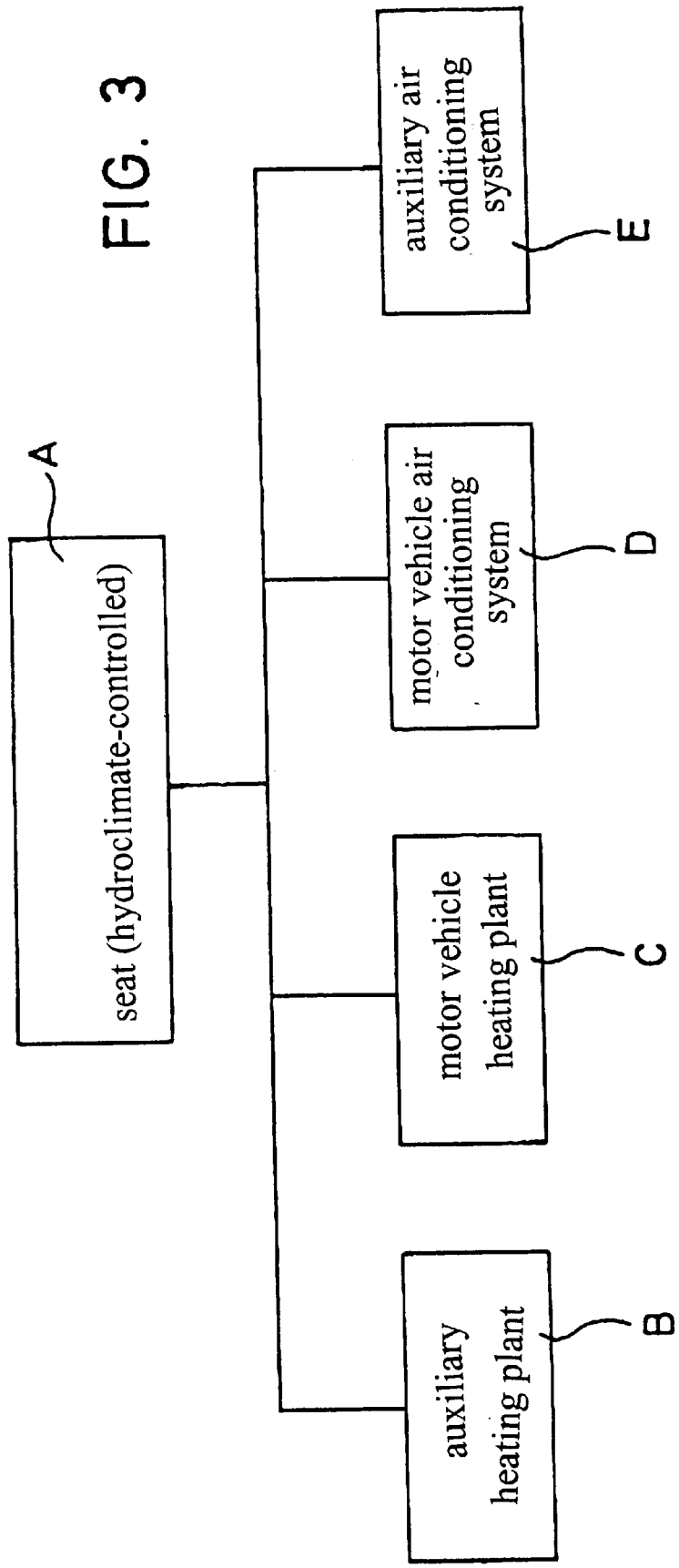

AIR CONDITIONABLE VEHICLE SEAT

BACKGROUND OF THE INVENTION

1. Field of the Invention

This invention relates to the area of interior climate comfort in motor vehicles. Standard motor vehicle equipment in this respect is the conventional motor vehicle heating system which calls for the air blown into the passenger compartment to be heated by the engine coolant. Alternatively, heating this air via a heat exchanger by means of auxiliary heating plant is also known. Finally, use of either the motor vehicle air conditioning system which works only when driving or alternatively an auxiliary air conditioning system is known.

Climate comfort in the passenger compartment of a motor vehicle furthermore includes the selective heating of the vehicle seats. Seat heating systems integrated into the seat have electrical heating elements which work solely when driving because they consume a relatively large amount of electric power which would have to be drawn from the motor vehicle battery when the vehicle is not moving.

2. Description of the Related Art

DE-OS 25 24 943 discloses an alternative electrical seat heating system in which a coolant-heated heating element is made using the principle of a rubber hot water bottle and is attached as a heat dispenser on the seat or back rest surfaces of the vehicle seat. These heating elements are connected to the engine coolant circuit; this entails the disadvantage that corrosive and toxic coolant is routed into the passenger compartment and in case of a leak can come into contact with a motor vehicle user.

Another measure for increasing the climate comfort in the passenger compartment of a motor vehicle is known for example from DE PS 1 962 665 in which an essentially rubber heating plate is described which is connected to the engine coolant circuit of the motor vehicle and which can be used for example for floor heating in the passenger compartment. Also with respect to this heating element, what was stated above with respect to the coolant applies. A similar floor heating body is known from DE GM 12 059.

From German utility model G 80 35 045.4 a piece of clothing for a motor vehicle user is known, especially for the uses of a commercial vehicle or an otherwise open motor vehicle which is provided with a hot air-carrying channel system with air passage openings to the individual wearing the piece of clothing. The hot air is delivered preferably from a hot air producer which is independent of the motor vehicle engine, for example, from a hot air fan. Aside from the obviously low level of comfort of this measure, it is a disadvantage that the entire body of the user is exposed to the blown air; this can lead to health problems in users who are correspondingly sensitive. This also applies to another known proposal according to which the blown air is routed through a motor vehicle seat to the vehicle passengers.

SUMMARY OF THE INVENTION

One object of this invention is to devise a motor vehicle seat which affords great ease of climate control by energy-favorable measures and which is safe to use.

All the measures for increasing the ease of climate control by means of a motor vehicle seat are based on a fluid for transport of heat or cold to a corresponding heating or cooling element or to a combined heating/cooling element which is installed in the motor vehicle seat and which is connected to a heat or cold source which is present in the vehicle for other heating or cooling purposes. This heating or cooling of the motor vehicle seat is favorable in terms of energy and in contrast to the corresponding prior art is also unobjectionable especially with respect to health and thus safe to use, because the corresponding heating and cooling fluid is taken from the secondary circuit of a heat exchanger which is preferably filled with pure water, i.e. with water which does not contain any harmful additives.

The present invention relates exclusively to heating of a motor vehicle seat and the heat exchanger provided for this purpose is connected on the primary-side for example to the conventional motor vehicle heating plant or auxiliary heating plant.

In accordance with one embodiment of the present invention, there is solely cooling of the motor vehicle seat and the secondary circuit of the heat exchanger in this case is connected to a motor vehicle air conditioning system or to a motor vehicle auxiliary air conditioning system.

The highest degree of climate control ease is afforded by another embodiment in which there is alternative heating/cooling of the motor vehicle seat, and the motor vehicle seat for this purpose can be connected selectively via a heat exchanger to the motor vehicle heating plant or the auxiliary heating plant or to the motor vehicle air conditioning system or the auxiliary air conditioning system.

In agreement with one especially advantageous embodiment of the invention, there is a means for switching between the different heat and cold producers present in the motor vehicle.

In the simplest case the heating or cooling element or the combined heating/cooling element for the motor vehicle seat can be connected to its own corresponding heat exchanger of the respective heat or cold producer.

Preferably the seat and backrest of the motor vehicle seat each have at least one heating and cooling element or a combined heating/cooling element which advantageously has hoses or tubes through which the respective fluid flows, which are laid in a meander configuration, and which are advantageously used in a flat construction shape. These hoses or tubes are integrated preferably into a flat cushion-shaped part which is installed in the backrest or the seat bordering the seat cover or backrest cover.

In the following the invention is detailed by way of example using the drawings:

BRIEF DESCRIPTION OF THE DRAWINGS

FIG. 1 shows a perspective front view of one embodiment of the motor vehicle seat as claimed in the invention;

FIG. 2 shows a perspective back view of the motor vehicle seat from FIG. 1, and

FIG. 3 schematically shows the connection of the motor vehicle seat as claimed in the invention to the heat or cold producer present in a vehicle.

DETAILED DESCRIPTION OF THE INVENTION

FIGS. 1 and 2 show a motor vehicle seat which is known in its basic configuration with an upholstered seat part 1 and an upholstered backrest part 2. In the embodiment shown hoses 3 and 4 laid in a meander shape are installed in the seat part I and into the backrest part 2 directly underneath the seat cover or the backrest cover which are shown cutaway in the area of the hoses 3 and 4 in FIG. 1. As follows from FIG. 2, the hoses 3 and 4 with their inflow and outflow ends 6, 7 and 8, 9 are connected in parallel and each is connected to a common inlet and floe hose 10 and return hose 11 which is connected to the secondary side of an exchanger not shown, which can be connected on the primary side to an on-board heat producer or cold producer or selectively to a heat producer or cold producer (likewise not shown) or which uses the heat exchanger of the corresponding heat producer or cold producer to cool or heat the seat.

The diagram of the fluid connection of the seat shown in FIGS. 1 and 2 follows from FIG. 3. Accordingly the seat A is connected selectively to the motor vehicle auxiliary heating plant or motor vehicle heating plant as the heat producer or to a motor vehicle air conditioning system or an auxiliary air conditioning system as the cold producer, optionally with upstream connection of a heat exchanger or using the heat exchanger of the respective heat or cold producer, in the case of full climate control of the motor vehicle seat moreover switching between the connection to the on-board heat producer or the on-board cold producer taking place selectively.

In one especially user-friendly version the motor vehicle seat is incorporated into the automatic climate control system such that the heat demand stipulated by the user via an interior temperature setpoint device and an outside temperature sensor automatically lead to affording a comfortable seat temperature, optionally by triggering a mixing valve for hot and cold water.

REFERENCE NUMBER LIST 1 seat part
2 backrest part
3 hoses
4 hoses
6, 7 inflow end
8, 9 outflow end
10 inlet hose
11 return hose
A seat
B auxiliary heating plant
C motor vehicle heating plant
D motor vehicle air conditioning system
E auxiliary air conditioning system

What is claimed is:

1. Motor vehicle seat for a motor driven land vehicle having a primary-side coolant circuit connected to the vehicle motor, said motor vehicle seat having at least one motor independent heating source for heating the motor vehicle seat, the at least one motor independent heating source being connected to a secondary heat exchanger circuit operated with water as a fluid coolant, the water being circulated in said secondary heat exchanger circuit which is separate from said primary-side coolant circuit and heated on a primary side of said secondary heat exchanger circuit by at least one on-board heat producer.

2. Motor vehicle seat as claimed in claim 1, wherein the water in the secondary heat exchanger circuit is free of corrosive or toxic additives.

3. Motor vehicle seat as claimed in claim 1 further including a means for switching between different heat producers and different cold producers.

4. Motor vehicle seat as claimed in claim 1, wherein the at least one on-board heat producer is the motor vehicle heating plant.

5. Motor vehicle seat as claimed in claim 1, wherein the on-board heat producer is the motor vehicle auxiliary heating plant.

6. Motor vehicle seat as claimed in claim 1, wherein the at least one heating element is connected to an on-board cold producer which is the motor vehicle air conditioning system.

7. Motor vehicle seat as claimed in claim 1, wherein the at least one heating element is connected to an on-board cold producer which is the motor vehicle auxiliary air conditioning system.

8. Motor vehicle seat as claimed in claim 1, wherein the at least one motor independent heating source comprises a plurality of heating elements, each of which is connected to its own corresponding heat exchanger of a heat producer.

9. Motor vehicle seat as claimed in claim 1, wherein a seat and a backrest of the motor vehicle seat each contain at least one of the heating element, a cooling element and a combined heating/cooling element.

10. Motor vehicle seat as claimed in claim 9, wherein the at least on of the heating element, the cooling element and the combined heating/cooling element has tubes laid substantially in a meander shape through which a respective fluid flows.

11. Motor vehicle seat as claimed in claim 10, wherein the tubes are integrated into a flat, roughly cushion-shaped part which is installed on an underside of at least one of a seat cover and a backrest cover of the motor vehicle seat.

12. Motor vehicle seat for a motor driven land vehicle having a primary-side coolant circuit connected to the vehicle motor, said motor vehicle seat having at least one motor independent heating/cooling source for selectively controlling the temperature of the motor vehicle seat, the at least one combined and motor independent heating/cooling source adapted to be selectively connected to at least one of a secondary heat exchanger circuit operated with water as a fluid coolant, the water being circulated in said secondary heat exchanger circuit which is separate from said primary-side coolant circuit and heated on a primary side of said secondary heat exchanger circuit by at least one on-board heat producer, and a secondary heat exchanger circuit operated with water as the fluid coolant, the water being circulated in said secondary heat exchanger circuit which is separate from said primary-side coolant circuit and cooled on the primary side of said secondary heat exchanger circuit by at east one on-board cold producer.

13. Motor vehicle seat as claimed in claim 12, wherein the water in the secondary heat exchanger circuit is free of corrosive or toxic additives.

14. Motor vehicle seat as claimed in claim 12, further comprising a means for switching between different heat producers and different cold producers.

15. Motor vehicle seat as claimed in claim 12, wherein the on-board heat producer is the motor vehicle heating plant.

16. Motor vehicle seat as claimed in claim 12, wherein the on-board heat producer is the motor vehicle auxiliary heating plant.

17. Motor vehicle seat as claimed in claim 12, wherein the on-board cold producer is the motor vehicle air conditioning system.

18. Motor vehicle seat as claimed in claim 12, wherein the on-board cold producer is the motor vehicle auxiliary air conditioning system.

19. Motor vehicle seat as claimed in claim 12, wherein the at least one motor independent heating/cooling source comprises a plurality of heating/cooling elements, each of which is connected to its own corresponding heat exchanger of a heat producer and a cold producer.

20. Motor vehicle seat as claimed in claim 12, wherein a seat and a backrest of the motor vehicle seat each contain at least one of a heating element, a cooling element and the combined heating/cooling element.

21. Motor vehicle seat as claimed in claim 20, wherein at least one of the heating element, the cooling element and the combined heating/cooling element has tubes laid substantially in a meander shape through which a respective fluid flows.

22. Motor vehicle seat as claimed in claim 21, wherein the tubes are integrated into a flat, roughly cushion-shaped part which is installed on an underside of at least one of a seat cover and a backrest cover of the motor vehicle seat.

* * * * *